No. 857,346. PATENTED JUNE 18, 1907.
W. G. HOLDEN.
PRESERVING APPARATUS.
APPLICATION FILED AUG. 8, 1906.
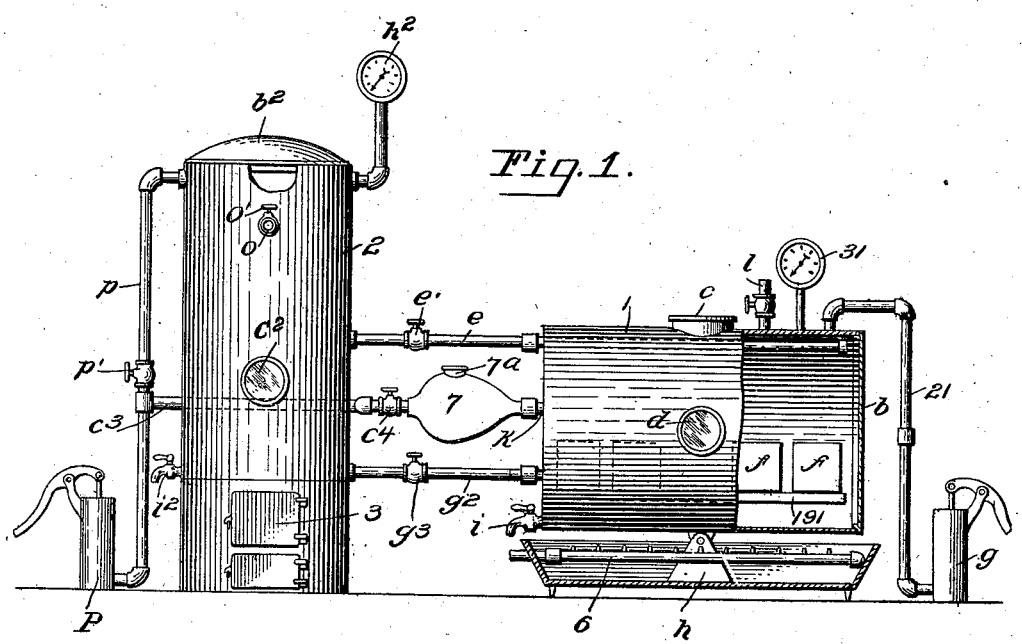
Fig. 1.
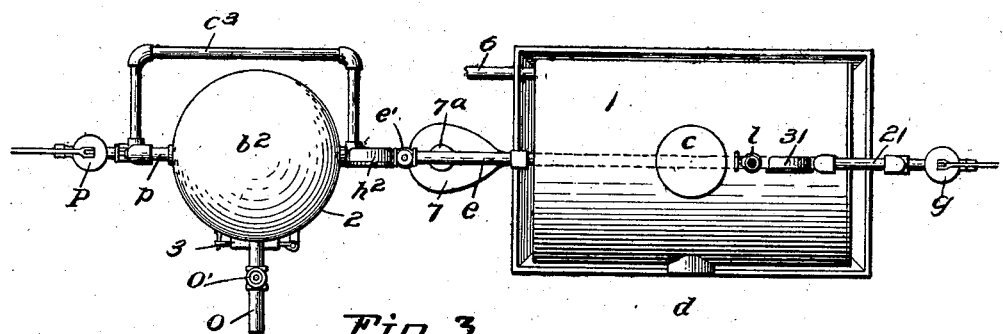
Fig. 2.
Fig. 3.
WITNESSES:
William G. Holden,
INVENTOR
By C. A. Snow & Co.
ATTORNEYS

UNITED STATES PATENT OFFICE.

WILLIAM G. HOLDEN, OF CORPUS CHRISTI, TEXAS.

PRESERVING APPARATUS.

No. 857,346.  Specification of Letters Patent.  Patented June 18, 1907.

Application filed August 8, 1906. Serial No. 329,792.

*To all whom it may concern:*

Be it known that I, WILLIAM G. HOLDEN, a citizen of the United States, residing at Corpus Christi, in the county of Nueces and State of Texas, have invented a new and useful Preserving Apparatus, of which the following is a specification.

My invention relates to apparatus for the impregnation of articles of food with a preservative or saccharine substance and it is designed to be used in the making of catsups, nut syrups, fruit candy and the like.

One object of my invention is to provide an improved and simplified apparatus for this purpose in which air pressure and vacuum are made use of to expedite its operation and in which the various fluids may be used cold or may be heated as desired. I also provide novel means for subjecting the article treated to a blast of powdered sugar.

With the above and further objects in view as will hereinafter appear, my invention consists in the parts, improvements and combinations of parts hereinafter set forth and claimed, it being understood that various changes in the form, proportion and arrangement of parts within the scope of the claims, may be resorted to without departing from the principle of my invention or sacrificing any of its advantages.

In this specification and in the drawings forming a part thereof the same reference characters are used to designate the same parts throughout.

In the drawings:—Figure 1 is a view in side elevation of a form of apparatus embodying the invention, a portion of which is broken away to exhibit the interior; Fig. 2 is a plan view of the apparatus; and Fig. 3 is a view in perspective of a candying device.

Referring to the drawings, 1 designates the vacuum tank where in pans $f$ the material to be treated is placed. Instead of the pans I may make use of other supporting means as the nature of the material to be treated requires. For example, in the crystallization of fruit I employ supports 19, shown in Fig. 3, having spurs or prongs $19^a$ on which is impaled the fruit, such as peaches, apples, etc. The supports are placed on rails 191 in the tank 1. A vacuum pump $g$ of any usual construction is suitably connected to the tank 1 by the pipe 21. A vacuum gage 31 on the tank 1 indicates the vacuum therein. At the top of the tank 1 is a removable filling cap $c$ which is used for introducing small quantities of material into the tank. The head $b$ of the tank is removable, however, for the insertion and removal of larger quantities of material. A relief cock $l$ is provided whereby the air may be allowed to pass into the tank.

At $d$ is shown a glass covered observation port through which the interior of the tank may be observed.

The syrup may be all removed from the tank by the draw off cock $i$.

The tank 1 is pivotally supported on the support $h$ and a heater 6 is placed beneath the tank 1 for use when it may be needed to dry out the contents thereof.

The syrup tank 2 has a removable head $b^2$, a pressure gage $h^2$, a glass covered observation port $c^2$, and a draw off cock $i^2$. A furnace 3 under the syrup tank provides means for heating the same. A pipe $e$ provided with a stop cock $e'$ leads from the syrup tank 2 to the tank 1 and the part thereof which is inside the tank 1 is provided with small spray openings for spraying the syrup over the material treated.

At the lower part of the syrup tank 2 and extending to the tank 1 is a pipe $g^2$ having a stop cock $g^3$. As this pipe is lower than the pipe $e$ it is made use of when it is desired to run syrup in a large quantity from tank to tank, the pipe $e$ being in the nature of a spray pipe, as shown in Fig. 1.

A short screw threaded pipe $o$ having a valve $o'$ is provided near the top of tank 2 for attachment to any desired source of supply as a tank of syrup or of water.

A pressure pump P having a suitable check valve is connected by the pipe $p$ to the top of the tank 2, a stop cock $p^1$ being placed in the pipe. Between the cock $p^1$ and the pump P a pipe $c^3$ runs from the pipe $p$ to the receptacle 7 which is between tanks 1 and 2. A cock $c^4$ is interposed in said pipe $c^3$. The receptacle 7 has a filling cap $7^a$ and is connected by a short pipe K with the tank 1, there being a coupling in the pipe K as well as in the pipes 21, $e$ and $g^2$ near the tank 1. These couplings may be disconnected so that the tank 1 may be tipped up on its pivot when desired.

The operation of my improved device is as follows:—The material to be treated, as fruit or nuts, is placed in the pans $f$ in the tank 1 and syrup is placed in the tank 2 through the pipe $o$. By pressure in tank 2 the preserving or saccharine fluid is sprayed from the pipe e on the material under treatment. The tank 1 may now be heated a partial vacuum being created therein by means of the vacuum pump so that boiling can take place at a low temperature. If desired the use of the vacuum pump may be dispensed with and the tank 1 heated with the cock $l$ open into the atmosphere. New syrup may be introduced into tank 1 as desired through pipes $e$ or $g^2$. To discharge powdered sugar on the material under treatment the powdered sugar is placed in the receptacle 7 which provides what I term a "puff" chamber, the cock $p^1$ closed and the cock $c^4$ opened and upon operating the pump, the sugar will be projected in a cloud through pipe K and directly upon the material in the tank 1 because there is a direct and unobstructed passage from the receptacle 7 to the material being treated. When the treatment is completed the removable head $b$ of the tank 1 is taken off and the material removed.

What I claim is:—

1. In an apparatus for preserving fruit and the like, a vacuum tank for containing the material to be treated, a pivotal support for the tank upon which the latter may be tilted, a heater for the vacuum tank, an air-exhaust pump and connections therefrom to the vacuum tank, a syrup tank, a heater, an air-pressure pump for said syrup tank, and connections from the syrup tank to the vacuum tank.

2. An apparatus for preserving fruit and the like comprising a vacuum tank, a heater and air-exhaust pump for the vacuum tank, a syrup tank, a heater and an air pressure pump for the syrup tank, a sprayer in the vacuum tank, a connection from the sprayer to the syrup tank, another connection between the vacuum and syrup tanks for delivering syrup to the vacuum tank in bulk, a powdered-sugar receptacle having direct and unobstructed connection with the interior of the vacuum tank, and connections between said receptacle and the air pressure pump.

In testimony that I claim the foregoing as my own, I have hereto affixed my signature in the presence of two witnesses.

WILLIAM G. HOLDEN.

Witnesses:
W. H. CHAPMAN,
F. B. WHEELER.